(12) United States Patent
Baldessari et al.

(10) Patent No.: US 8,880,009 B2
(45) Date of Patent: Nov. 4, 2014

(54) METHOD FOR PERFORMING COMMUNICATION IN A SELF-ORGANIZED WIRELESS NETWORK

(75) Inventors: Roberto Baldessari, Heidelberg (DE); Damiano Scanferla, Maerne (IT); Long Le, Dossenheim (DE); Wenhui Zhang, Heidelberg (DE); Andreas Festag, Ladenburg (DE)

(73) Assignee: NEC Europe Ltd., Heidelberg (DE)

( * ) Notice: Subject to any disclaimer, the term of this patent is extended or adjusted under 35 U.S.C. 154(b) by 358 days.

(21) Appl. No.: 13/498,915

(22) PCT Filed: Sep. 28, 2010

(86) PCT No.: PCT/EP2010/005903
§ 371 (c)(1),
(2), (4) Date: Mar. 29, 2012

(87) PCT Pub. No.: WO2011/038881
PCT Pub. Date: Apr. 7, 2011

(65) Prior Publication Data
US 2012/0184321 A1 Jul. 19, 2012

(30) Foreign Application Priority Data
Sep. 29, 2009 (EP) .................................... 09012324

(51) Int. Cl.
*H04B 1/034* (2006.01)
*H04W 52/34* (2009.01)
(Continued)

(52) U.S. Cl.
CPC .......... *H04W 52/267* (2013.01); *H04W 52/343* (2013.01); *H04W 52/0219* (2013.01); *H04W*
(Continued)

(58) Field of Classification Search
USPC ................................ 455/11.1, 13.1, 99, 152.1
See application file for complete search history.

(56) References Cited

U.S. PATENT DOCUMENTS

2008/0002573 A1 1/2008 Mosko et al.
2010/0049819 A1* 2/2010 Hamada et al. ............... 709/207
2010/0312432 A1 12/2010 Hamada et al.

FOREIGN PATENT DOCUMENTS

EP 2 133 849 A1 12/2009
JP 2008017484 A 1/2008
(Continued)

OTHER PUBLICATIONS

Huaying Xu, Matthew Barth: "A transmission-interval and power-level modulation methodology for optimizing inter-vehicle communications", VANET'04, ACM, 2 Penn Plaza, Suite 701—New York USA, Oct. 1, 2004, XP040009419, Item 2.2 and 3.

(Continued)

*Primary Examiner* — Tu X Nguyen
(74) *Attorney, Agent, or Firm* — Young & Thompson

(57) ABSTRACT

A method for performing communication in a self-organized wireless network, in particular a vehicular network, preferably based on the IEEE 802.11 MAC protocol, wherein the network includes a plurality of network nodes each being equipped with a communication system, wherein the communication systems generate periodic messages that are transmitted via a dedicated wireless communication channel, wherein each of the communication systems employs specific transmission parameters—message interval and transmit power—for transmitting the periodic messages, is characterized in that a reliability threshold for a maximum admissible load of the communication channel is defined, and that each network node, taking into consideration information on network nodes in its surrounding, establishes a relation between the message interval and the transmit power—interval-power-relation—such that the reliability threshold is not exceeded, wherein each network node applies its established interval-power-relation to adjust transmit power and/or message interval of its outgoing periodic messages.

20 Claims, 4 Drawing Sheets

Figure 1:
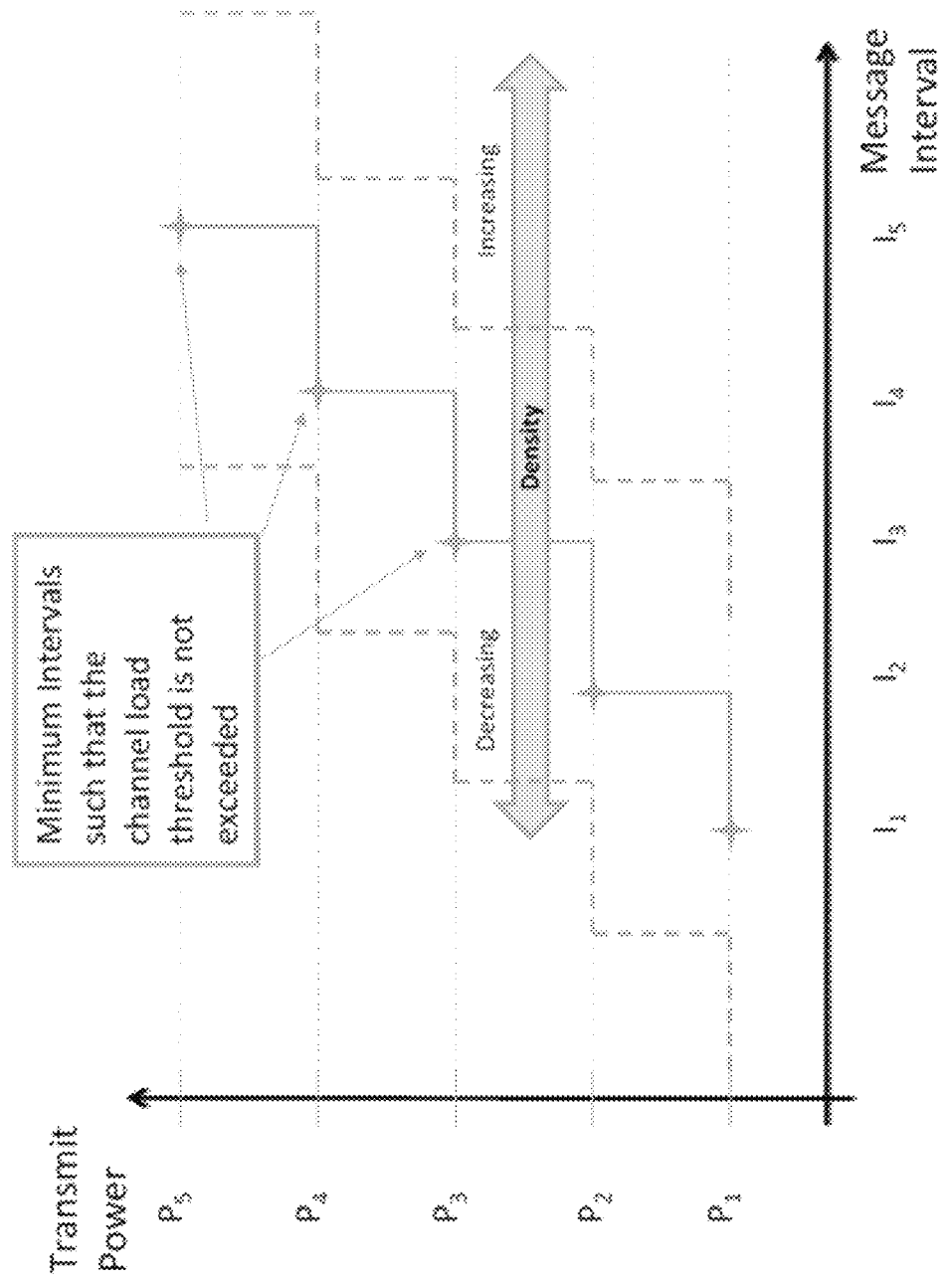

(51) Int. Cl.
  C09D 5/08 (2006.01)
  C09D 163/00 (2006.01)
  H04W 52/26 (2009.01)
  *H04W 52/02* (2009.01)
  *H04W 84/18* (2009.01)
  *H04W 74/08* (2009.01)
  *H04W 52/36* (2009.01)

(52) U.S. Cl.
  CPC .......... 84/18 (2013.01); C09D 5/08 (2013.01); H04W 74/08 (2013.01); C09D 163/00 (2013.01); *H04W 52/367* (2013.01)
  USPC ............................................ 455/99; 455/453

(56) References Cited

FOREIGN PATENT DOCUMENTS

| | | |
|---|---|---|
| JP | 2008244519 A | 10/2008 |
| JP | 2009059199 A | 3/2009 |
| WO | 2008/104886 A2 | 9/2008 |
| WO | 2009107297 A1 | 9/2009 |

OTHER PUBLICATIONS

Zang Y et al.: "Congestion Control in Wireless Networks for Vehicular Safety Applications", Proceedings of the 8th European Wireless Conference, Paris, France, [Online] Jul. 1, 2007, pp. 1-7, XP002537201, ISBN: 978-2-912328-41-0 Retrieved from the Internet: URL:http://www.comnets.rwth-aachen.de/publications/gesamtlisten/abstracts/2007/zastchrepabaew2007.html> [retrieved on Jul. 1, 2007] sections II-V.

Ching-Ling Huang et al: "Robustness Evaluation of Decentralized Self-Information Dissemination Control Algorithms for VANET Tracking Applications", Vehicular Technology Conference Fall (VTC 2009-Fall), 2009 IEEE 70th, IEEE, Piscataway, NJ, USA, Sep. 20, 2009, pp. 1-5, XP031600158, ISBN: 978-1-4244-2514-3 abstract.

International Search Report, dated Mar. 4, 2011, from corresponding PCT application.

Japanese Office Action, dated Jun. 19, 2013, from corresponding JP application.

* cited by examiner

METHOD FOR PERFORMING COMMUNICATION IN A SELF-ORGANIZED WIRELESS NETWORK

The present invention relates to a method for performing communication in a self-organized wireless network, in particular a vehicular network, preferably based on the IEEE 802.11 MAC protocol, wherein said vehicular network includes a plurality of network nodes each being equipped with a communication system, wherein said communication systems generate periodic messages that are transmitted via a dedicated wireless communication channel, wherein each of said communication systems employs specific transmission parameters—message interval and transmit power—for transmitting said periodic messages.

Self-organizing wireless networks or ad hoc networks are gaining more and more importance. Such networks are characterized in that communication nodes spontaneously form a wireless network among each other without any superordinate organizing entity being involved. Vehicular networks, in which the vehicles are equipped with a communication system, such that the vehicles themselves constitute the communication nodes that form the network, are the most prominent representatives of this kind of communication networks.

Vehicular communication is considered a key technology for Intelligent Transport Systems (ITS) because it has the potential to increase road safety and traffic efficiency. For this purpose, the mature, inexpensive, and widely available 802.11 wireless LAN technology appears very attractive and a vehicular is being standardized (see for reference IEEE P802.11p/D7.0—Draft Standard for Information Technology—Telecommunications and information exchange between systems—Local and metropolitan area networks—Specific requirements—Part 11: Wireless LAN Medium Access Control (MAC) and Physical Layer (PHY) specifications—Amendment 7: Wireless Access in Vehicular Environments). In vehicular networks based on this technology, vehicles are equipped with wireless transceivers and can spontaneously form an ad hoc network among themselves. Vehicles can use the ad hoc network to communicate with each other in order to support safety applications such as cooperative collision warning.

Recognizing the potential of vehicular communication, the European Commission has recently allocated a 30-MHz frequency band (5875-5905 MHz) for safety-related communication of Intelligent Transport Systems. Communication systems and applications to be used in this frequency band are being standardized by ETSI TC ITS, where a European profile of 802.11 is being finalized.

In vehicular networks, cars issue periodic messages in order to inform the neighboring cars about their position, speed, direction etc. This information is exchanged, for example, in order to prevent a collision by informing the driver when an accident may occur. The necessary frequency of these periodic messages depend on contextual parameters like relative speed, drivers' intentions etc. It is therefore expected that applications will need to vary the interval between consecutive periodic messages according to the scenario. In addition to that, the load caused by periodic data traffic has to be controlled so that resources are available for urgent and unpredictable event-driven messages.

Due to the lack of a coordinating entity and to the random access scheme (CSMA—Carrier Sense Multiple Access) adopted by 802.11 as the MAC protocol, network congestion or even saturation may occur. In this context network congestion is referred to as the situation where the network load, expressed as the percentage of time in which the channel is occupied by a carrier signal, is such that the network reliability degrades below a certain threshold (e.g. 90% of reception probability). Further, even when the channel utilization is below the saturation level, the reliability of the packet delivery considerably degrades as the load increases, i.e. due to the random access scheme, in fact, the number of collisions increases with the network load.

For these reasons, within C2C-CC (Car to Car-Communication Consortium), ETSI and other projects a goal of maintaining the channel load below a certain reliability threshold has been identified, e.g. 20% of the time with the signal above the clear channel assessment threshold. So far, only mechanisms based either on sole power (e.g. M. Torrent-Moreno, P. Santi, H. Hartenstein, "Distributed Fair Transmit Power Adjustment for Vehicular Ad Hoc Networks", Proc. of Sensor and Ad Hoc Communications and Networks, 2006. SECON '06) or sole rate control (e.g. M. Drigo, W. Zhang, R. Baldessari, L. Le, A. Festag, M. Zorzi, "Distributed Rate Control Algorithm for VANETs (DRCV)", in VANET 2009) have been proposed aiming at maintaining the network load below the threshold.

Some attempts aim at combining power and message generation rate in a single algorithm. The solution investigated in document Chonlatee Khorakhun, Holger Busche and Hermann Rohling, "Congestion Control for VANETs based on Power or Rate Adaptation", Proceedings of WIT, March 2008 includes a parallel execution of two separate algorithms for transmit power and message interval, which fails, however, in providing the desired flexibility.

EP 2 133 849 A1 also discloses a procedure that provides transmit power and message interval separately.

The document Kishore Ramachandran, Ravi Kokku, Honghai Zhang, and Marco Gruteser, "Symphony: Synchronous Two-phase Rate and Power Control in 802.11 WLANs" combines physical data rate and transmit power but for consumer 802.11a/b/g access based on unicast traffic and is therefore not applicable to safety applications, which are mainly broadcast-based.

In the document Huaying Xu, Matthew Barth, "A Transmission-Interval and Power-Level Modulation Methodology for Optimizing Inter-Vehicle Communications", Proceedings of ACM Mobicom 2004, September 2004 a technique to combine message interval and transmit power is briefly overviewed, where the propagation environment is used to identify some pre-defined combinations of power and interval.

In WO 2008/104886 A2 interval and transmit power are modified based on speed/acceleration information, which fails as congestion control technique in scenarios more complex (and realistic) than 1-direction highways with inter-vehicle distance perfectly proportional to vehicles' speed.

It is therefore an object of the present invention to improve and further develop a method for performing communication in a vehicular network of the initially described type in such a way that network congestion is prevented or at least drastically suppressed in a flexible and reliably way that is easy to be implemented by the nodes of the network.

In accordance with the invention, the aforementioned object is accomplished by a method comprising the features of claim 1. According to this claim, such a method is characterized in that a reliability threshold for a maximum admissible load of said communication channel is defined, and that each network node, taking into consideration information on network nodes in its surrounding, establishes a relation between said message interval and said transmit power—interval-power-relation—such that said reliability threshold is not exceeded, wherein each network node applies its established interval-power-relation to adjust transmit power and/or message interval of its outgoing periodic messages.

The present invention specifies a distributed algorithm for the control of network congestion in wireless ad hoc networks, preferably in vehicular networks. According to the invention, it has first been recognized that power-only or rate-only congestion control mechanisms are disadvantageous in several aspects and that both the message interval and the transmit power affect the network load. Therefore, the present invention combines in one single algorithm transmit power control and inter-message transmission interval control (aka transmit rate control) with a real-time mutual adaptation of the two. So far, no power control method exists which takes into account the different levels of congestion caused by nodes sending with different message intervals. Similarly, no inter-message interval control technique has been proposed that takes advantage of possible variations in the transmit power. It is noted that some prior art attempts aim at combining power and message generation rate in a single algorithm but end up with a mere parallel execution of two separate algorithms, which fails in providing the desired flexibility or do not provide a target level of channel load while allowing for different combination of interval and power.

According to the present invention transmit power and message interval are controlled in a single, predictive two-step algorithm and therefore match the target level of channel load. Thus, applications that are executed by the network nodes can vary the message generation interval according to the situation, while the aggregated channel load is maintained at the target level. In particular, it allows applications to trade off between inter-message transmission intervals and transmit power to meet their specific requirements in a flexible manner. Therefore, for instance, the method according to the present invention is particularly suitable to prevent network congestion from occurring in vehicular networks based on the IEEE 802.11 standard. Depending on the specific definition of the reliability threshold the method maintains the network load below the pre-defined threshold which may correspond to, e.g., a certain probability of reception.

Furthermore, the method according to the present invention is advantageous in that it does not require any additional signaling traffic and that it runs in a totally distributed way. However, since it applies a distributed congestion control algorithm, the method should be executed by as many network nodes as possible to be effective.

According to a preferred embodiment the information a network node takes into consideration for interval-power-relation establishment includes the number of network nodes located within its communication range. This number reflects the node density in the network node's surrounding and, basically, it can be assumed that the probability of the wireless communication channel getting congested increases with the node density. Therefore, the higher the node density, the more restricted will be the interval-power-relation established by the network node. With respect to an even higher reliability and accuracy it may be provided that the network node also takes into consideration, the levels of transmit power and/or message interval adopted by network nodes in its neighborhood.

Advantageously, the interval-power-relation establishment is performed in a proactive fashion. In such proactive approach, for various levels of transmit power a network node may determine the minimum message interval that can be adopted such that, assuming that every network node in the resulting communication range uses that same message interval, the reliability threshold will not be exceeded, i.e. channel congestion will be—sufficiently—unlikely to occur. The mutual effect of transmit power and message interval may be determined for each level of transmit power available at the communication system of the network node. In particular, it may be provided that the levels of transmit power are calibrated such that they correspond to predetermined communication ranges.

Alternatively, the interval-power-relation establishment may be performed in a reactive fashion. In such reactive approach, the mutual effect of transmit power and message interval may be derived, e.g., based on the measured level of congestion of the communication channel. Additionally or alternatively, the levels of transmit power and message intervals adopted by the neighbors of a network node may be detected, for instance implicitly by measuring the respective arrival times, and may be considered for establishing the interval-power-relation.

Basically, the communication system residing in every network node may apply the established interval-power-relation to the outgoing data traffic of the network node in order to limit either the transmit power or the message interval, or both. In particular, given a certain periodic packet generation rate selected by an application of the network node and detected by the communication system, the communication system may issue the periodic packets with a transmit power equal or lower than the level of transmit power identified by its respective interval-power-relation.

As mentioned above, the interval-power-relation identified in the first step can be used to limit either the transmit power given the desired outgoing rate (corresponding to a specific message interval) or the outgoing rate given the desired power, or both. However, according to a preferred embodiment the outgoing rate desired by applications is given a higher priority and the transmit power is derived from it. It is to be noted, though, that the outgoing rate is still limited, for example, when the transmit power cannot be reduced any further.

According to a further preferred embodiment network nodes analyze the behavior of other network nodes located within their communication range, and, based on the results of the analysis, they restrict the range of values of their own transmit power and message interval on the basis of their established interval-power-relation. For instance, in a cooperative way a network node may limit its transmit power based on the inter-message interval used by the neighboring nodes. In connection with vehicular networks simulations show that if one or more cars need to increase the frequency of their messages (e.g. when approaching an intersection), a transmit power reduction by neighboring nodes is necessary in order to maintain the channel reliable. Various metrics can be adopted to take into account the aggregate neighbors behavior. For example, each node can determine the minimum among the inter-message intervals adopted by its neighbors and use this value to limit its own transmit power.

In particular, with respect to particularly effective congestion prevention, it may be provided that every network node estimates (again, e.g., implicitly by measuring the arrival intervals) the message interval in use by every neighbor and determines the minimum message interval $I_{min}$. Next, the minimum message interval $I_{min}$ is used to delimit the range of the transmit power level that can be used, thereby still following the established interval-power-relation. By doing so, network nodes are enabled to vary their periodic message generation rate in special situations or under particular circumstances. For instance, they may increase their outgoing periodic traffic rate (i.e. shorten the message interval) in dangerous situations for road safety (e.g. street intersection, braking etc.), while the aggregated channel load is maintained below the desired reliability threshold.

Other metrics beside or in combination with the minimum message interval $I_{min}$ described above can be used to take into account the aggregate neighbors behavior. For example, network nodes may employ the channel busy time (CBT) in order to restrict the range of values of its own transmit power and message interval on the basis of its established interval-power-relation. CBT denotes the percentage of time in a certain observation interval in which the carrier signal is above the clear channel assessment (CCA) threshold. Thus, CBT is a direct indication of the channel load.

With respect to an efficiency enhancement it may be provided that the interval-power-relation established by a network node is updated at regular intervals. By regularly updating the interval-power-relation, the available bandwidth of the wireless communication channel can be exploited in an optimal fashion, since unnecessary restrictions of transmit power and/or message interval can be effectively avoided. For instance, upon performing investigations for updating its interval-power-relation a network node may realize that the channel load has decreased, and it may thus establish a less restricted interval-power-relation that allows for an increased transmit power and/or transmission rate (i.e. a reduced message interval).

Alternatively, it may be provided that interval-power-relation updates are performed only in case the number of network node located within the communication range of a network node changes. In real application scenarios that consider realistic traffic situations it may prove beneficial to define a certain number of network nodes, e.g. 5 or 10, depending on the scenario, and to perform the update each time the change in the number of network nodes located within the communication range of a network node exceeds that predefined number.

According to a preferred embodiment the reliability threshold may be defined as the threshold above which the packet delivery reliability degrades below a predefined value, e.g. below 90% of reception probability. For instance, the network load, expressed as the percentage of time in which the employed communication channel is occupied by a carrier signal, may be taken as reference for determining the threshold.

Figure 2:
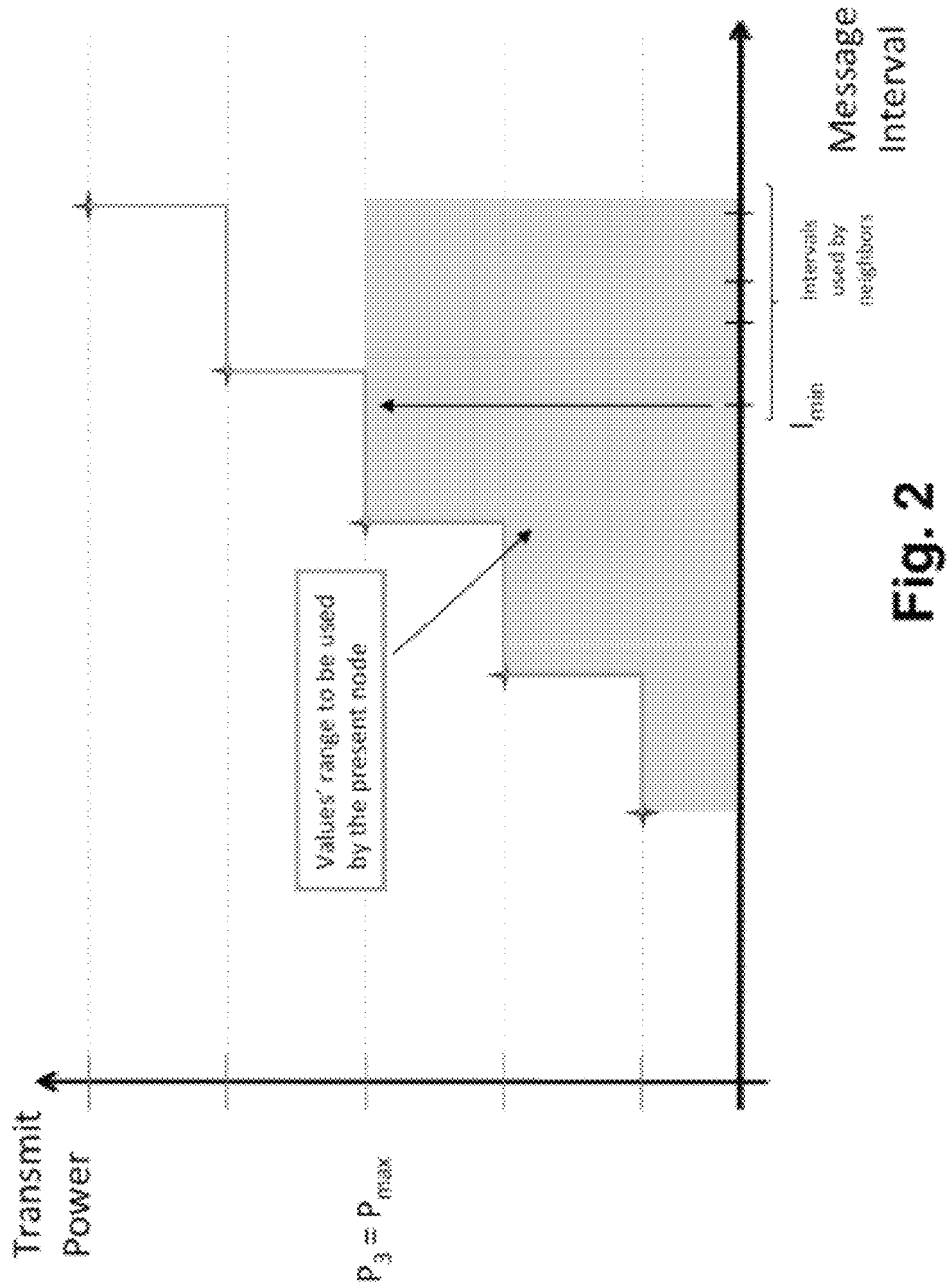
Figure 3:
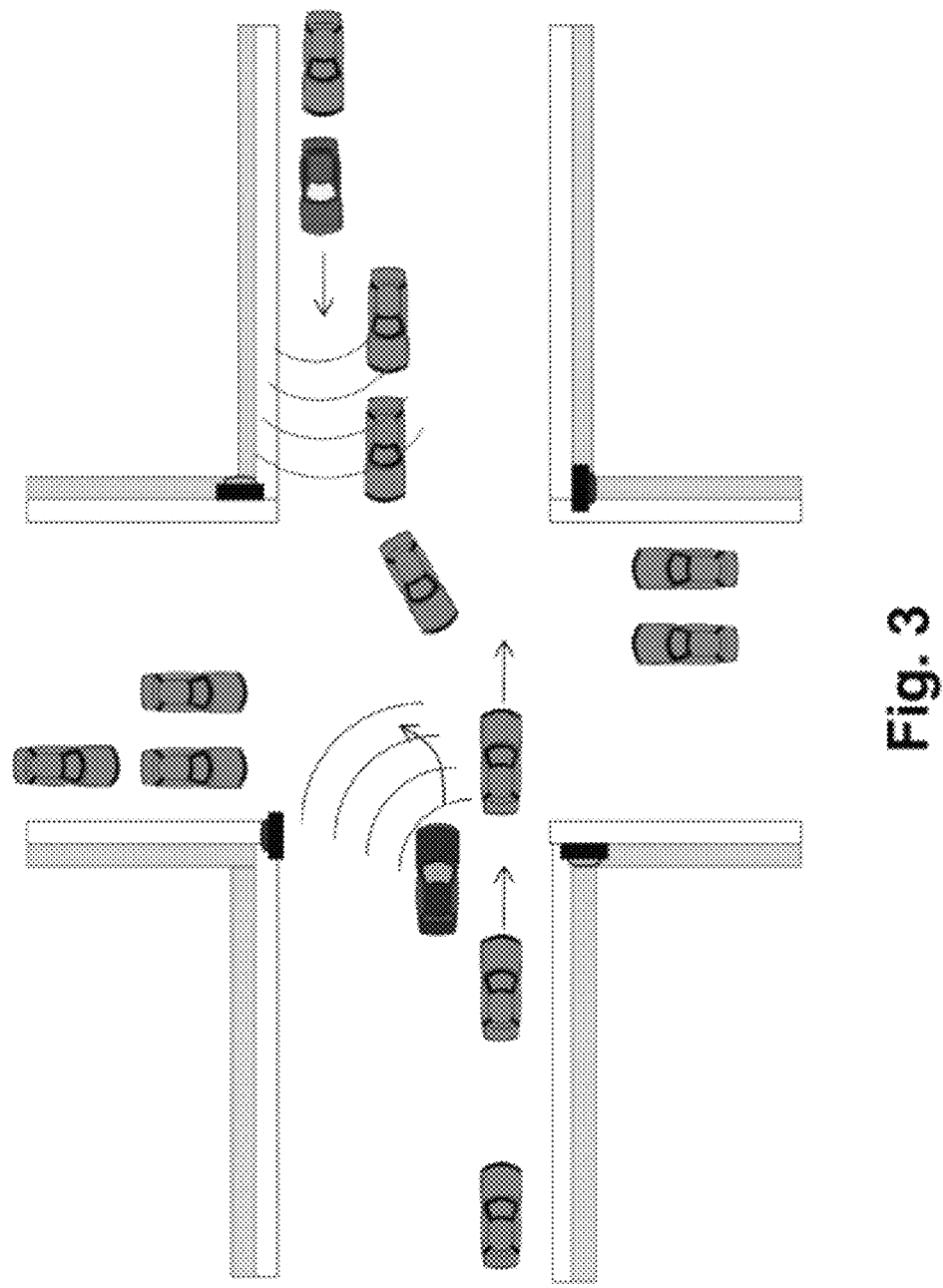
Figure 4:
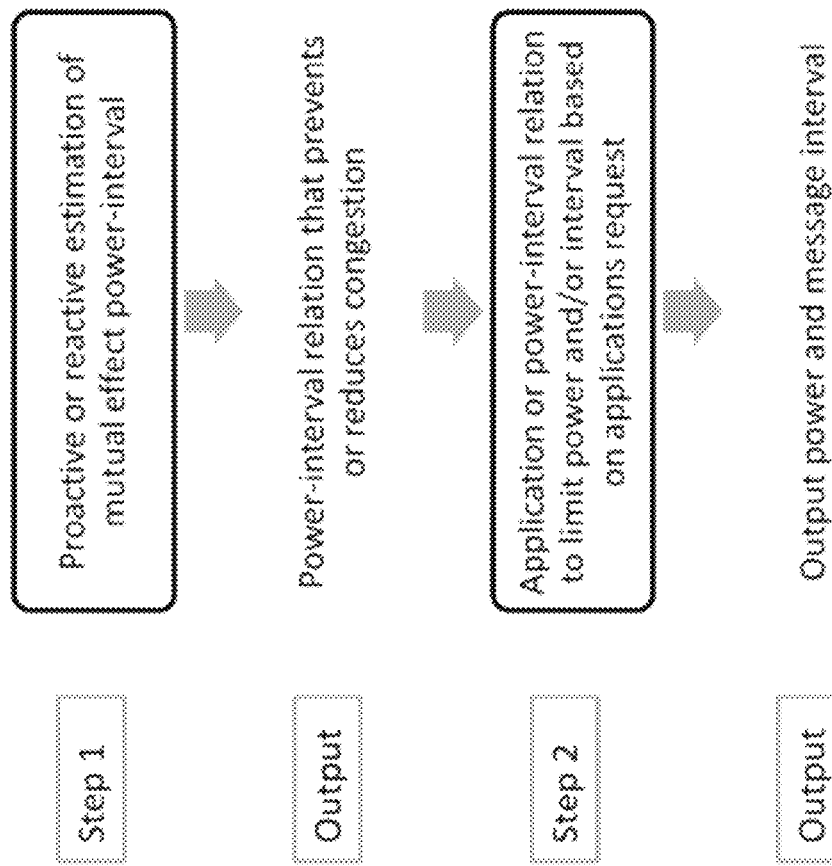

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing FIG. 1 is a schematic view of an embodiment of a method according to the present invention illustrating the interval-power-relation establishment, FIG. 2 is a schematic view of an embodiment of a method according to the present invention illustrating a procedure for limiting transmit power, FIG. 3 is a schematic view of an embodiment of a method according to the present invention illustrating a scenario where mobile stations need to increase their sending rate, and FIG. 4 is a schematic view of an embodiment of a method according to the present invention illustrating the single steps of transmit power and/or message interval adaptation.

In the context of the embodiment of the present invention illustrated in FIG. 1, it is assumed that a short-range vehicular network is in place, which is based on the 802.11 MAC protocol and that in each network node, i.e. in each mobile station, which are the vehicles forming the network, it is possible to identify a communication system (consisting of L4 and below) and one or more applications which generate two types of data traffic: periodic traffic, i.e. heartbeat-like messages, and optionally additional event-drive traffic that is typically triggered by a particular event. Furthermore, it is assumed that a level of channel load has been identified as a reliability threshold, above which, due to the random nature of the 802.11 MAC and the lack of an Access Point, the packet delivery reliability degrades, e.g. for 20% of the time the signal is above the clear channel assessment threshold/sensitivity.

Before turning to the congestion prevention mechanism proposed by the present invention, the main limitations of prior art approaches are summarized as follows:

Power-only or rate-only congestion control mechanisms assume that, respectively, the generation rate or the transmit power is constant. This assumption is not valid as both the power and the generation rate of periodic messages are expected to vary based on application-specific parameters as well as the channel utilization;

Previously proposed mechanisms do not allow for a flexible and dynamic allocation of channel resources in terms of both time and space (both spatial and temporal aspects of resource sharing). In fact, these mechanisms do not allow stations to maintain a constant level of aggregated channel utilization while their packet generation rates vary.

Existing mechanisms cannot offer the flexibility to trade off between transmit power and transmit rate in a dynamic manner. However, this flexibility is often required to support heterogeneous applications with different requirements, for instance in VANETs (Vehicular Ad Hoc NETworks). For example, one application requires a high message transmission rate but at a low power level. On the other hand, another application might only need to send data at a low rate but a high power level.

According to the present invention a single algorithm is adopted by each communication system of the mobile stations in order to adjust the outgoing sending rate of periodic messages (i.e. the inter-message interval, or in the following briefly denoted message interval) and their transmit power. According to an embodiment the algorithm consists in two steps that are carried out successively. In the first step, each mobile station estimates the mutual effect of transmit power and message interval based on the node density in the surrounding. This can be done in a proactive or reactive way. In the proactive approach, for each available level of transmit power a mobile station determines the minimum message interval that can be adopted such that, assuming that every mobile station in the resulting communication range uses that interval, channel congestion will not occur, or, to put it more precisely, the defined reliability threshold will not be exceeded. In the reactive approach, the mutual effect of transmit power and message interval can be derived based on the measured level of congestion and the levels of transmit power and message interval adopted by the neighbors. In both proactive and reactive cases, the first step provides as output a relation between transmit power and message intervals—interval-power-relation—that allows for congestion prevention or congestion reduction.

The embodiment of FIG. 1 illustrates a proactive approach where the minimum message intervals are computed for each possible level of transmit power available at the mobile station's communication system. The results are indicated by the stars. In the illustrated example there are 5 levels of transmit power, e.g. $P_i$ with $i=1, \ldots, 5$ between 0 and 20 dBm, which may be set by means of a calibration procedure such that they correspond to 5 typically desired communication ranges (e.g. 100 to 500 meters). These 5 points determine a curve which identifies an interval-power-relation (indicated by the continuous curve). Since the points are computed taking into account the number of neighbors, the curve can move according to the nodes density. This effect is indicated by the dashed curves: if the density increases, the interval-power-relation becomes more restrictive, i.e. the same inter-message interval corresponds to a lower transmit power. If the density decreases, stations can send with full power even for shorter inter-message intervals.

In the second step, the communication system residing in every mobile station applies the interval-power-relation to the outgoing data traffic to limit the transmit power and rate (message interval). In particular, given a certain periodic packet generation rate selected by the applications that are run by the mobile station and detected by the communication system, the communication system will issue the packets with a transmit power equal or lower than the level of transmit power identified by the interval-power-relation as depicted in FIG. 1.

It is to be noted that the interval-power-relation identified in the first step can be used to limit either the transmit power given the desired outgoing rate or the outgoing rate given the desired transmit power or both. In a preferred embodiment explained below, the outgoing rate desired by applications is given a higher priority and the transmit power is derived from it. However, the outgoing rate is still limited for example when the transmit power cannot be reduced any further. In the case illustrated in FIG. 1 this means that message intervals smaller than $I_1$ are not allowed since the transmit power cannot be reduced below $P_1$.

Referring to FIG. 2, a preferred embodiment of the present invention is illustrated, where the inter-message interval (or, briefly, message interval, or outgoing rate of periodic data packets) adopted by the neighboring mobile stations of a mobile station is used to restrict the range of values of interval and power, still following the interval-power relation determined in the first step explained in connection with FIG. 1. In particular, every mobile station estimates the inter-message interval in use by every neighbor and determines the minimum inter-message interval $I_{min}$. Next, the minimum inter-message interval $I_{min}$ is used to delimit the range of the transmit power level that can be used. In the diagram of FIG. 2, where a limitation of transmit power on the basis of $I_{min}$ yields $P_3$ as the maximum transmit power, the admissible operation range is indicated by the hatched region.

The preferred embodiment explained above allows stations to increase their outgoing periodic traffic rate under particular circumstances, while the aggregated channel load is maintained below the defined reliability threshold. FIG. 3 depicts a typical situation in which vehicles may want to increase their outgoing periodic traffic rate in order to gain more safety. More specifically, FIG. 3 illustrates a vehicle approaching an intersection with the intention of turning left, wherein the vehicles will increase their sending rate (decrease the inter-message interval). The same will be done by nodes approaching the intersection in the opposite direction. Simulations show that, in this typical situation, in order to maintain the aggregated channel load below the desired reliability threshold it is necessary that not only the two mentioned nodes decrease their transmit power, but also their neighbors. In a cooperative way, nodes that are not directly involved in the dangerous situation decrease their power to allow the two (or more) stations affected by the situation to increase their sending rate without exceeding the reliability threshold.

It should be noted that the embodiment of the present invention described above does not introduce unfair conditions for accessing the channel. In fact, those nodes which decrease their transmit power as a consequence of a message interval decrease operated by one or more of their neighbors, can increase their sending rate as well. The present invention recognizes that a transmit power decrease operated by the single station or by a small portion of the nodes that need to increase their sending rate is not enough to balance the substantial increase in the channel load caused by the rate variation.

FIG. 4 schematically summarizes the two steps applied by each mobile station of a vehicular network according to the present invention in order to reduce or even prevent congestion of the employed wireless communication channel. In the first step, the mutual effect of transmit power and message interval is estimated and, based thereupon, an interval-power-relation is established. This can be done either proactively, e.g. by means of a proactive estimation of minimum inter-message intervals for each available transmit power level, such that the aggregated network load is below the pre-defined reliability threshold, or reactively, e.g. by detecting a congested channel and, therefore, considering the mutual effect of transmit power and message interval when reducing the self-generated data traffic load.

In the second step, given a certain inter-message interval desired by applications based on their contextual analysis, the algorithm provides the maximum transmit power level that can be adopted for that particular inter-message interval based on the interval-power-relation identified in the first step. The algorithm may also increase the actual outgoing inter-message interval, e.g. in the case that the transmit power cannot be reduced any further.

To further explain aspects of the present invention, some typical numerical values are given. 802.11 p PHY and MAC layer are adopted with QPSK (Quadrature Phase Shift Keying) modulation, ½ coding rate, 10 MHz channel bandwidth and center frequency 5.900 GHz (ETSI TC ITS, Control Channel, 180), resulting in a nominal rate of 6 Mb/s. 5 reference levels of transmit power corresponding to 5 typically desired communication ranges (100, 200, 300, 400 and 500 meters) can be derived knowing the receiver sensitivity (a value of −87dBm is chosen, which is between 0 the value employed in IEEE P802.11 p/D7.0 and the sensitivity provided by quality commercial hardware) and applying a reference propagation model (e.g. Nakagami fading with fading figure m=3, 1.5 and 1 according to the distance). Typical values of transmit power are 1, 7, 10, 13, 16 dBm. Given the communication range identified by each transmit power level, the packet size (assumed constant) of 500 Bytes and a linear density of 40 vehicles/km, the 5 minimum inter-message intervals are approximately 200, 160, 125, 85 and 45 ms, corresponding to repetition frequency of 5, 6.25, 8, 11 and 22 Hz.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for performing communication in a self-organized wireless network, in particular a vehicular network, wherein said network includes a plurality of network nodes each being equipped with a communication system, wherein said communication systems generate periodic messages that are transmitted via a dedicated wireless communication channel, wherein each of said communication systems employs specific transmission parameters—message interval and transmit power—for transmitting said periodic messages, comprising:
defining a reliability threshold for a maximum admissible load of said communication channel, and that each network node, taking into consideration information on network nodes surrounding the network node, establishes a relation between said message interval and said transmit power—interval-power-relation—such that said reliability threshold is not exceeded,
wherein each network node applies the network node's established interval-power-relation to adjust transmit power and/or message interval of the network node's outgoing periodic messages, and
a communication system of the network node, when adjusting transmission parameters based on the network node's established interval-power-relation, gives higher priority to an adjustment of said message interval.

2. The method according to claim 1, wherein said information a network node takes into consideration for interval-power-relation establishment include a number of network nodes located within the network node's communication range, and/or the levels of transmit power and/or message interval adopted by those network nodes.

3. The method according to claim 2, wherein said interval-power-relation establishment is performed in a proactive fashion.

4. The method according to claim 2, wherein said interval-power-relation establishment is performed in a reactive fashion.

5. The method according to claim 1, wherein said interval-power-relation establishment is performed in a proactive fashion.

6. The method according to claim 5, wherein the network node determines for various levels of transmit power the minimum message interval that can be adopted such that, assuming that all network nodes in the network node's respective resulting communication range employ that message interval, said reliability threshold will not be exceeded.

7. The method according to claim 6, wherein said levels of transmit power are calibrated such that they correspond to predetermined communication ranges.

8. The method according to claim 1, wherein said interval-power-relation establishment is performed in a reactive fashion.

9. The method according to claim 8, wherein the network node derives said interval-power-relation from a measured level of congestion of said communication channel and/or from levels of transmit power and message intervals employed by network nodes being located in the network nodes communication range.

10. The method according to claim 1, wherein said message interval is increased in case said transmit power cannot be reduced any further.

11. The method according to claim 1, wherein said network nodes inform other network nodes located within their communication range about their message intervals.

12. The method according to claim 1, wherein the network node employs the minimum message interval of those message intervals adopted by other network nodes located within their communication range in order to restrict the range of values of the network node's own transmit power and message interval on the basis of its established interval-power-relation.

13. The method according to claim 1, wherein the interval-power-relation established by a network node is updated at regular intervals.

14. The method according to claim 1, wherein interval-power-relation established by a network node is updated each time the number of network nodes located within the communication range of said network node changes.

15. The method according to claim 1, wherein said reliability threshold is being defined as the threshold above which the packet delivery reliability degrades below a predefined value.

16. The method according to claim 1, wherein the communication is based on the IEEE 802.11 MAC protocol.

17. A method for performing communication in a self-organized wireless network, in particular a vehicular network, wherein said network includes a plurality of network nodes each being equipped with a communication system, wherein said communication systems generate periodic messages that are transmitted via a dedicated wireless communication channel, wherein each of said communication systems employs specific transmission parameters—message interval and transmit power—for transmitting said periodic messages, comprising:
defining a reliability threshold for a maximum admissible load of said communication channel, and that each network node, taking into consideration information on network nodes surrounding the network node, establishes a relation between said message interval and said transmit power—interval-power-relation—such that said reliability threshold is not exceeded,
wherein each network node applies the network node's established interval-power-relation to adjust transmit power and/or message interval of the network node's outgoing periodic messages, and
said network nodes analyze the behavior of other network nodes located within their communication range, and, based on the results of said analysis, restrict the range of values of their own transmit power and message interval on the basis of their established interval-power-relation.

18. The method according to claim 17, wherein the communication is based on the IEEE 802.11 MAC protocol.

19. A method for performing communication in a self-organized wireless network, in particular a vehicular network, wherein said network includes a plurality of network nodes each being equipped with a communication system, wherein said communication systems generate periodic messages that are transmitted via a dedicated wireless communication channel, wherein each of said communication systems employs specific transmission parameters—message interval and transmit power—for transmitting said periodic messages, comprising:
defining a reliability threshold for a maximum admissible load of said communication channel, and that each network node, taking into consideration information on network nodes surrounding the network node, establishes a relation between said message interval and said transmit power—interval-power-relation—such that said reliability threshold is not exceeded, wherein each network node applies the network node's established interval-power-relation to adjust transmit power and/or message interval of the network node's outgoing periodic messages, and the network node employs the channel busy time CBT in order to restrict the range of values of its own transmit power and message interval on the basis of its established interval-power-relation.

20. The method according to claim 19, wherein the communication is based on the IEEE 802.11 MAC protocol.

* * * * *